United States Patent [19]

Brown

[11] 4,413,214

[45] Nov. 1, 1983

[54] VENTED PNEUMATIC FOOT CONTROLLER

[75] Inventor: Jack Brown, Union, N.J.

[73] Assignee: The Singer Company, Stamford, Conn.

[21] Appl. No.: 320,393

[22] Filed: Nov. 12, 1981

[51] Int. Cl.³ .................. G05B 5/00

[52] U.S. Cl. .................. 318/488; 318/305; 200/81 H

[58] Field of Search .................. 318/488, 305; 338/4, 338/36, 42, 47, 153; 200/81 H, 86.5; 112/271, 276, 277, DIG. 23

[56] References Cited

U.S. PATENT DOCUMENTS

| | | | |
|---|---|---|---|
| 595,898 | 12/1897 | Whipple et al. . | |
| 2,267,218 | 12/1941 | Reinecke | 200/81 H |
| 2,550,422 | 4/1951 | Naul . | |
| 2,561,663 | 7/1951 | Keckley | 200/86 |
| 2,688,821 | 9/1954 | Bunting | 200/81 H |
| 4,169,353 | 10/1979 | Fresard . | |
| 4,371,762 | 2/1983 | Diamond | 338/42 X |

FOREIGN PATENT DOCUMENTS

| | | | |
|---|---|---|---|
| 54-168944 | 11/1979 | Japan . | |
| 325580 | 11/1957 | Switzerland | 112/276 |
| 606578 | 11/1978 | Switzerland | 112/276 |
| 1299432 | 12/1972 | United Kingdom | 200/81 H |
| 989691 | 4/1965 | United Kingdom | 112/276 |
| 1560686 | 12/1977 | United Kingdom . | |

*Primary Examiner*—Ulysses Weldon
*Attorney, Agent, or Firm*—William V. Ebs; Robert E. Smith; Edward L. Bell

[57] ABSTRACT

A speed controlling arrangement for an electric motor is provided with a pneumatic foot controller which includes a bulb that is opened to the atmosphere between operative periods to equalize pressure in both the bulb and a transducer, but is closed when foot pressure is applied to the bulb to actuate the transducer.

6 Claims, 5 Drawing Figures

VENTED PNEUMATIC FOOT CONTROLLER

DESCRIPTION

FIELD OF THE INVENTION

The invention relates to speed control means for electric motors, especially sewing machine motors.

DESCRIPTION OF THE PRIOR ART

A speed control system for the electric motor of a sewing machine may include a pneumatic foot controller, a pneumatic to electric transducer responsive to the operation of the foot controller, and a silicon controlled rectifier circuit for controlling the motor according to the operation of the transducer. It is an advantage of such a so called pneumatic system that the foot controller can be produced inexpensively as compared to the foot controller for an all electrical system due to the fact that no high voltage connections are required at the pneumatic foot controller necessitating the use of insulating devices to protect an operator from shock. However, the pneumatic systems are commonly sealed and this presents a problem since a sealed system is affected by ambient temperature and pressure changes.

It is a prime object of the present invention to provide an improved motor speed control system in which a pneumatic foot controller is vented between operative periods to render the system unaffected by ambient temperature and pressure changes.

Other objects and advantages of the invention will become apparent during a reading of the specification taken in connection with the accompanying drawings.

SUMMARY OF THE INVENTION

A motor speed control system is provided, in accordance with the invention, with a pneumatic foot controller including a pedal operated elastomeric bulb which connects through tubing with a pneumatic to electric transducer that controls a motor energizing circuit. As the bulb is partially collapsed by foot pressure, applied pressure is increased in the transducer to effect an increase in the speed of the motor. When foot pressure is relieved the bulb expands and pressure is decreased in the transducer to effect a decrease in motor speed. The bulb includes an insert with a vent hole which is closed by engagement of the insert with a pad on the controller when foot pressure is applied to the bulb, and which is opened when foot pressure is relieved. External and internal pressures are equalized while the bulb is open to the atmosphere and the system is thereby rendered insensitive to ambient temperature and pressure changes. Regardless of such changes, applied pressure at the transducer and the speed of the motor due to the operation of the foot controller remain the same for any particular collapsed volume of the bulb.

DESCRIPTION OF THE PREFERRED EMBODIMENT

Figure 1:
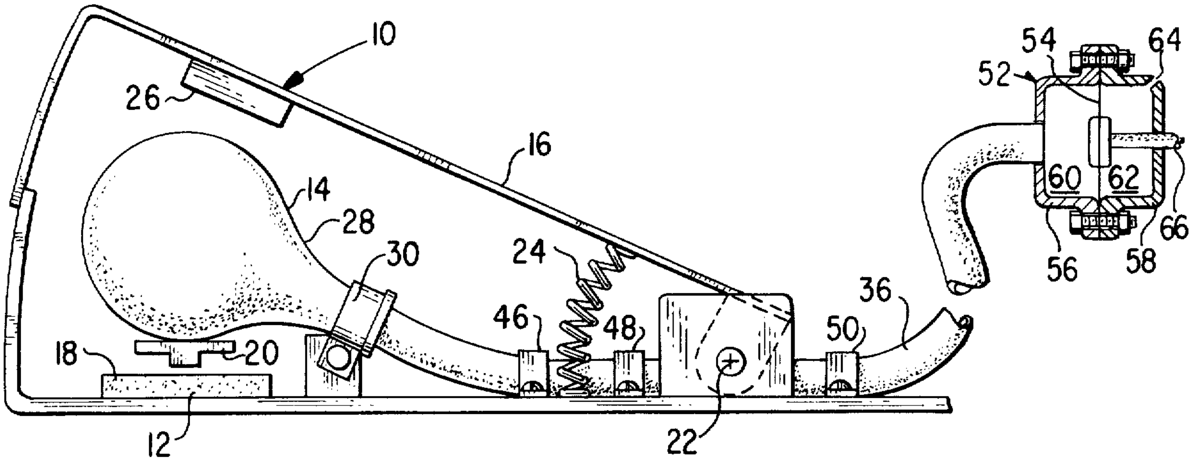
FIG. 1 is a schematic illustration showing a foot controller according to the invention and a transducer operated thereby.

Referring to the drawings, reference character 10 designates a foot controller according to the invention including a base 12 to rest upon the floor, a collapsible bulb 14 of rubber or other elastomeric material, and a foot pedal 16. The controller further includes a soft spongy pad 18 on the base 12 and a valve insert 20 in the bulb 14.

Foot pedal 16 is mounted on the base 12 for pivotal movement about an axis at 22, and is biased upwardly over the base by a spring 24. In the absence of foot pressure, the pedal 16 is caused by spring 24 to assume the position shown in FIG. 1 wherein a member 26 on the underside of the pedal is out of contact with the bulb.

Bulb 14 is secured at the neck 28 by a collar 30 against the inclined surface 32 of a member 34 which is affixed to and extends upright from base 12. The bulb is caused to extend in the unactuated condition of the foot pedal at an angle relative to the base as determined by the inclination of surface 32 while the pedal is in the FIG. 1 position. The pedal connects with flexible tubing 36 by way of a nozzle 38. As shown, the nozzle has a reduced end portion 40 which extends on one side of a nozzle flange 42 into the tubing and has an enlarged end portion 44 which extends on the other side of flange 42 into the neck of the bulb. Collar 30 embraces neck 28 about enlarged end portion 44 of the nozzle (see FIGS. 3 and 4).

Tubing 36 is secured with brackets 46, 48 and 50 to the base 12 and extends therefrom to a pneumatic-electric transducer 52 which is shown as including a flexible diaphragm 54 between housing portions 56 and 58. The diaphram defines chambers 60 and 62 on opposite sides thereof. Chamber 60 connects with the tubing 36, and chamber 62 is preferably vented to the atmosphere as for example at 64. An output member 66 affixed to the diaphram 54 extends through chamber 62 and housing portion 58.

Figure 2:
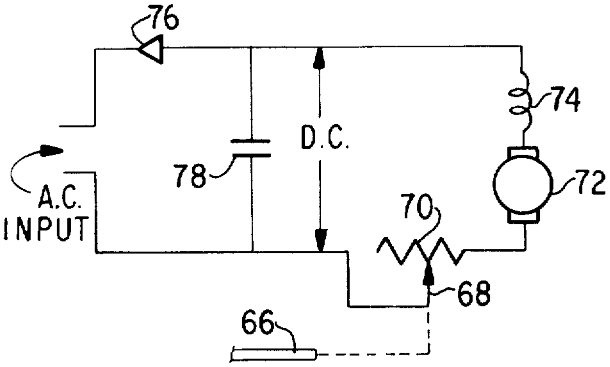
FIG. 2 is a schematic illustration of a motor circuit controlled by the foot controller.
Figure 5:
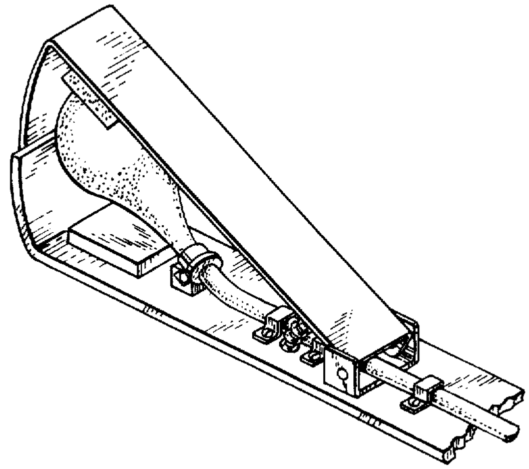
FIG. 5 is a perspective view of the foot controller.

The transducer output member 66 connects with a slider 68 movable along the resistance 70 of a potentiometer. As shown, the slider and resistance are in series in the motor circuit of FIG. 2 with motor armature 72 and field winding 74. A rectifier 76 and condenser 78 in the circuit convert an AC input to DC.

Figure 3:
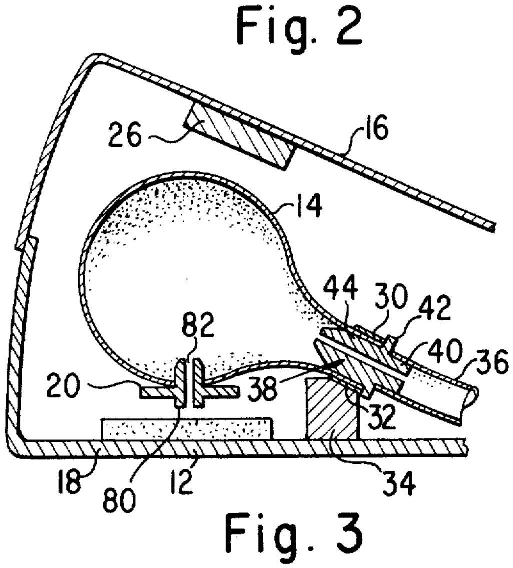
FIG. 3 is a fragmentary view, partially in section, of the foot controller shown with the foot pedal thereon in a released position.
Figure 4:
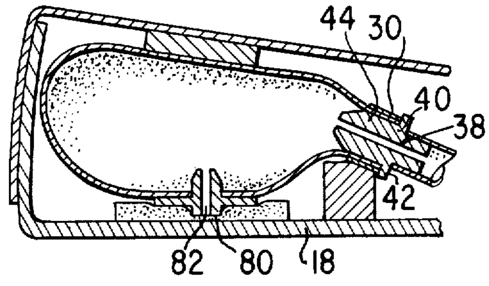
FIG. 4 is a view similar to FIG. 3, shown with the foot pedal depressed.

As already noted, member 26 on the underside of pedal 16 is out of contact with bulb 14 in the absence of foot pressure on the pedal. The bulb is then in a position wherein it is effective to hold valve insert 20 above pad 18 (FIG. 3). When foot pressure is applied to the pedal 16, it is pivoted downwardly against the bias of spring 24. The bulb is engaged by member 26, and is then moved downwardly with respect to the neck 28 to cause outer projecting end 80 of valve insert 20 to engage pad 18 which closes off vent hole 82 through the valve insert to the atmosphere (FIG. 4). The pad is of an elastomeric material permitting the end 80 of the valve insert to sink into the material, and may, for example, be composed of sponge rubber or a cellular polyurethane plastic. Valve insert 20 is preferably secured to the bulb 14 with a suitable plastic adhesive.

As foot pressure on pedal 16 is increased following the closing of vent hole 82 in the valve insert to the atmosphere, the bulb is caused to collapse somewhat and air pressure in the bulb and transducer is increased. The diaphram 54 in the transducer is deflected due to the increased pressure and output member 66 is caused to move slider 68 along potentiometer resistor 70 to increase motor speed. As foot pressure on the pedal is relaxed, air pressure in the bulb 14 and transducer chamber 60 decreases and flexible diaphram 54 acting through output member 66 moves slider 68 to decrease motor speed. When an operator's foot is removed from the pedal, the pedal is caused by spring 24 to assume its unactuated position and the valve insert is returned to its position above pad 18 in which the bulb is open to the atmosphere through vent hole 82.

External and internal pressures of the bulb and transducer are necessarily equalized between operative periods of the foot controller due to the valve insert 20 being opened to atmospheric air at such times. As a consequence, any particular amount of pressure applied to the foot pedal to squeeze the bulb 14 always results in the same pressure within the bulb and transducer chamber 60, and therefor the same motor speed regardless of ambient temperature or pressure conditions. This is in contrast to the situation with closed pneumatic control systems where temperature and pressure conditions in the environment affect pressure within the system independently of the operation of a pneumatic control bulb.

It is to be understood that the present disclosure relates to a preferred embodiment of the invention which is for purposes of illustration only and is not to be construed as a limitation of the invention. Numerous alterations and modifications of the structures herein disclosed will suggest themselves to those skilled in the art, and all such modifications and alterations which do not depart from the spirit and scope of the invention are intended to be included within the scope of the appended claims.

I claim:

1. In combination, a pneumatic foot controller including a base, a foot pedal mounted for movement on the base, a bulb of an elastomeric material which is held at a defined location against movement relative to the base but which is movable about the defined location by foot pressure on the pedal, an insert in the bulb with a vent hole in the insert, a pad of elastomeric material which is affixed to an inside surface of the controller in a position to be forcibly engaged by the insert and to close the vent hole following movement of the bulb about said defined location, and spring means for moving the foot pedal away from the bulb whereby the insert is permitted to separate from the pad and open the vent hole when foot pressure is removed from the pedal; a pneumatic-electric transducer; tubing which connects the bulb to the transducer and through which the bulb controls pressure in the transducer; and an electric motor which is connected to the transducer and which has its speed regulated in accordance with pressure in the transducer.

2. The combination of claim 1 wherein the bulb is secured at a neck to the base and the bulb is movable about said neck to a position wherein the elastomeric pad is engaged by the bulb insert.

3. The combination of claim 1 wherein said pad engageable by the insert is of a polyurethane material.

4. The combination of claim 1 wherein the foot pedal is mounted for pivotal movement on the base.

5. The combination of claim 2 wherein the tubing is connected to the bulb at said neck.

6. The combination of claim 1 wherein the foot pedal extends over at least a portion of the bulb, the insert is in the bottom of the bulb and said pad is under the insert.

* * * * *